United States Patent
Hsiao et al.

(10) Patent No.: US 10,452,706 B2
(45) Date of Patent: Oct. 22, 2019

(54) METHOD AND SYSTEM FOR HANDLING IMAGES ON A MULTI-TOUCH DEVICE

(71) Applicant: OATH INC., New York, NY (US)

(72) Inventors: Shu-Fang Hsiao, Taipei (TW); Kaili Chiang, Taipei (TW); Shih-Chiang Lin, Taipei (TW)

(73) Assignee: OATH INC., New York, NY (US)

( * ) Notice: Subject to any disclaimer, the term of this patent is extended or adjusted under 35 U.S.C. 154(b) by 290 days.

(21) Appl. No.: 13/909,233

(22) Filed: Jun. 4, 2013

(65) Prior Publication Data
US 2014/0358877 A1 Dec. 4, 2014

(51) Int. Cl.
*G06F 16/00* (2019.01)
*G06F 16/51* (2019.01)

(52) U.S. Cl.
CPC .................... *G06F 16/51* (2019.01)

(58) Field of Classification Search
CPC ....... G06F 17/3028; G06F 16/50; G06F 16/51
USPC .......................................... 707/695; 345/660
See application file for complete search history.

(56) References Cited

U.S. PATENT DOCUMENTS

| | | | |
|---|---|---|---|
| 6,281,874 B1 * | 8/2001 | Sivan ................... | G06F 17/3028 345/2.1 |
| 6,700,589 B1 * | 3/2004 | Canelones et al. .......... | 345/660 |
| 2012/0057015 A1 * | 3/2012 | Ward ............................ | 348/80 |
| 2014/0375648 A1 * | 12/2014 | Katakawa et al. ........... | 345/428 |

\* cited by examiner

*Primary Examiner* — Hares Jami
(74) *Attorney, Agent, or Firm* — James J. DeCarlo; Greenberg Traurig, LLP

(57) ABSTRACT

Disclosed is a system and method for gesture-based content-object rendering. The present disclosure provides for optimized display of a high-resolution image upon receiving input, such as a spread gesture, from a user respective of a displayed low-resolution image. The low-resolution and high-resolution image are subdivided into content objects or blocks and stored in a content database. Upon receiving the user input, the input areas respective of the image is identified, and the high-resolution image block is displayed. Subsequently, adjacent blocks corresponding to the input area are then displayed to effectuate an efficient download of the high-resolution image.

16 Claims, 11 Drawing Sheets

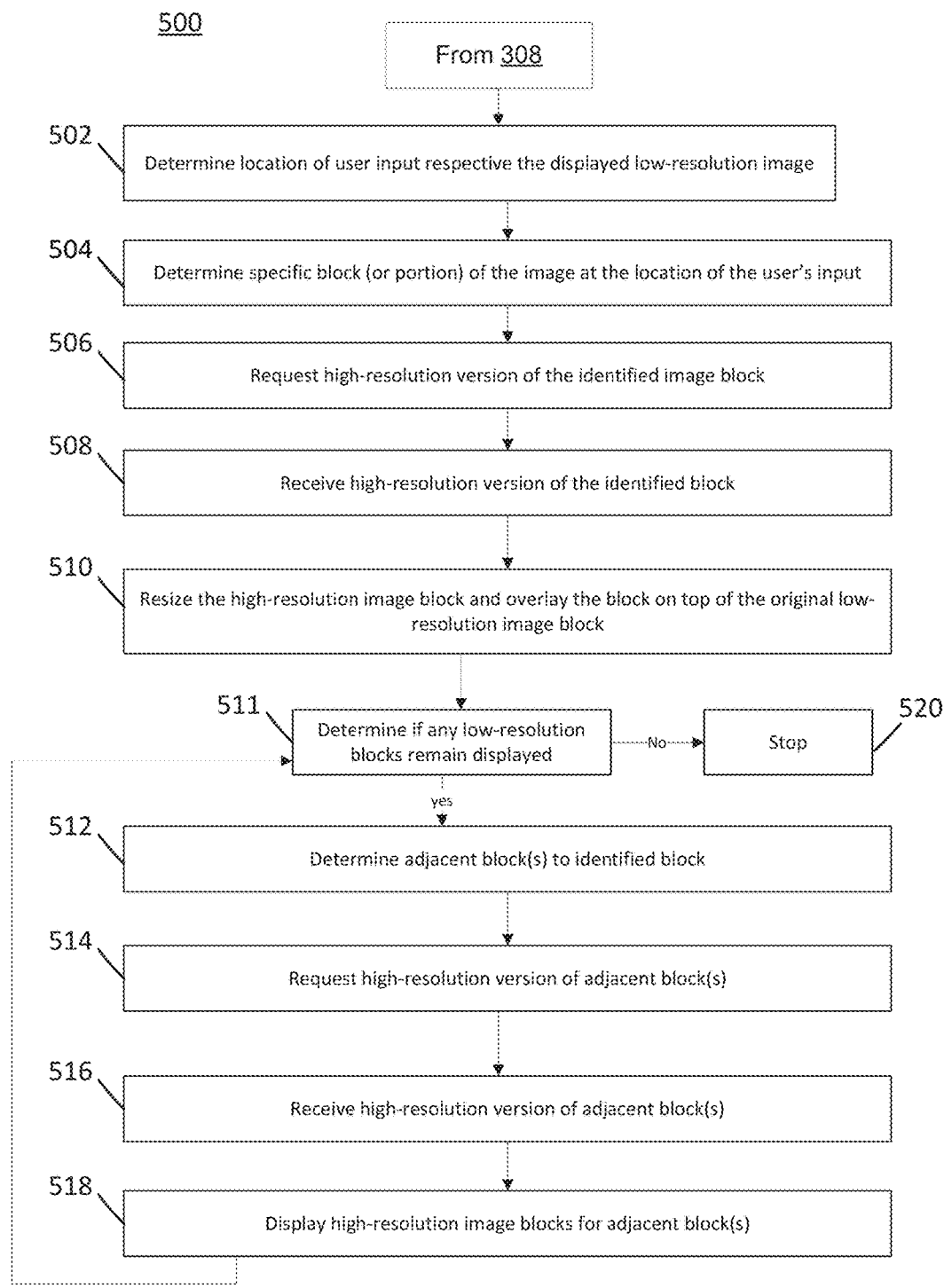

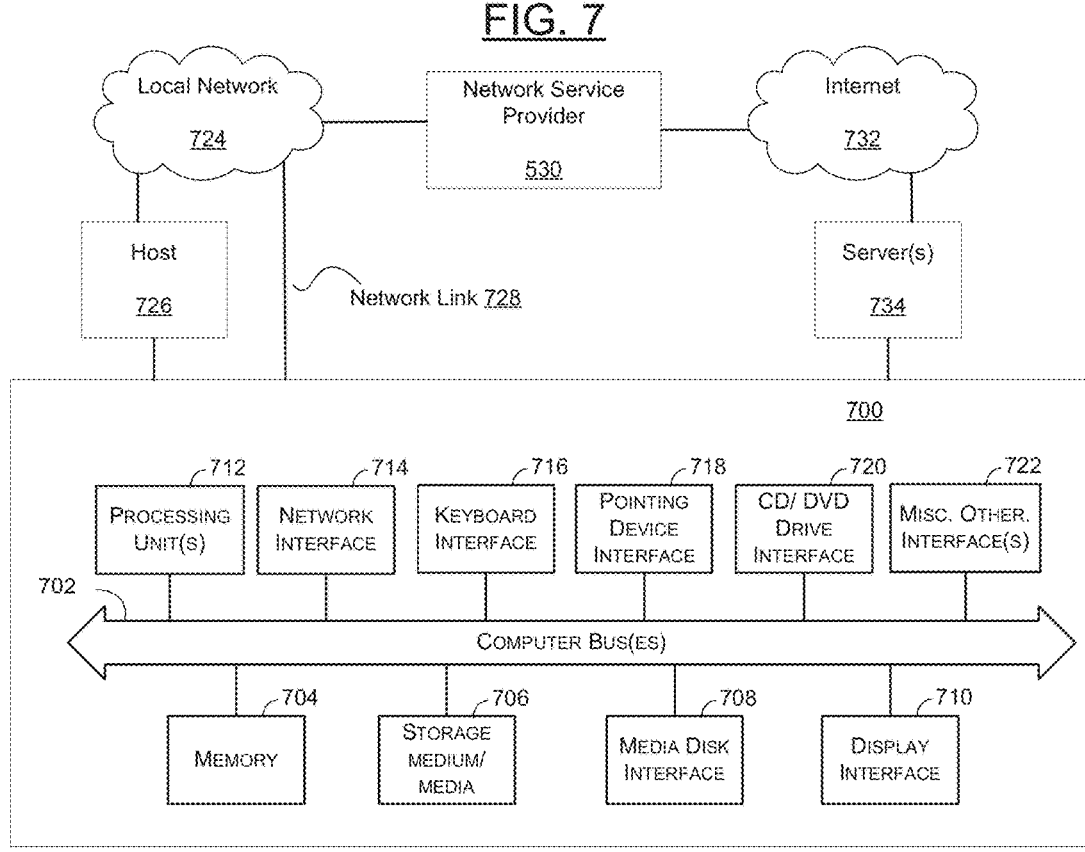

METHOD AND SYSTEM FOR HANDLING IMAGES ON A MULTI-TOUCH DEVICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever

FIELD

The present disclosure relates generally to displaying high-resolution images on a multi-touch device, and more specifically, to a piecemeal download of a high-resolution image in order to expedite image download time on a multi-touch device.

BACKGROUND

Conventional gesture-based zooming techniques can receive a gesture respective to a content object, e.g., image, and, in response, zoom into or out of a view of the content object. These conventional techniques often display a coarse, low definition version of the image that involves significant lag time in downloading the image. Therefore, the desired imagery is not presented at a high enough resolution which, ultimately, results in a poor user experience.

SUMMARY

The present disclosure describes systems and methods for optimizing the display and download of high-resolution images. The systems and methods discussed herein provide enhanced image quality in addition to reducing or negating extensive wait or lag times for displaying and downloading high-resolution images. In current image display implementations, when an image is enlarged or zoomed in on, the image looks coarse and is unclear. Also, the user must endure a lag period while a high-resolution version of the image is downloaded. The present disclosure addresses these issues. Exemplary embodiments of the present disclosure involve displaying a high-resolution version of a previously displayed low-resolution image. As will be discussed herein, the present disclosure provides systems and methods for optimizing the processes for rendering high-resolution images.

In accordance with one or more embodiments, a method is disclosed which includes communicating, via a computing device over a network, a request for content from a content provider, said content provider associated with a database storing a first content version of said content and a second content version of said content, each content version comprising a subdivision of content blocks mapped to respective content blocks of the other content version; receiving, at the computing device, the first content version in response to said request, said receiving comprising receiving subdivision information describing the subdivision of the first content version; displaying, via the computing device, the first content version on a display associated with the computing device; receiving, at the computing device, an input from a user corresponding to the displayed first content version; identifying, via the computing device, a first content block of the displayed first content version corresponding to the input based on the subdivision information; fetching, via the computing device, a second content block associated with the second content version based on the subdivision information; and displaying, via the computing device, the second content block.

In accordance with one or more embodiments, a non-transitory computer-readable storage medium is provided, the computer-readable storage medium tangibly storing thereon, or having tangibly encoded thereon, computer readable instructions that when executed cause at least one processor to a method for handling images on a multi-touch device in accordance with embodiments discussed herein.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 is a flowchart of a process for displaying a high-resolution image in accordance with some embodiments of the present disclosure;

FIG. 7 is a block diagram illustrating an internal architecture of an example of a computing device according to some embodiments of the present disclosure.

DESCRIPTION OF EMBODIMENTS

Figure 1:
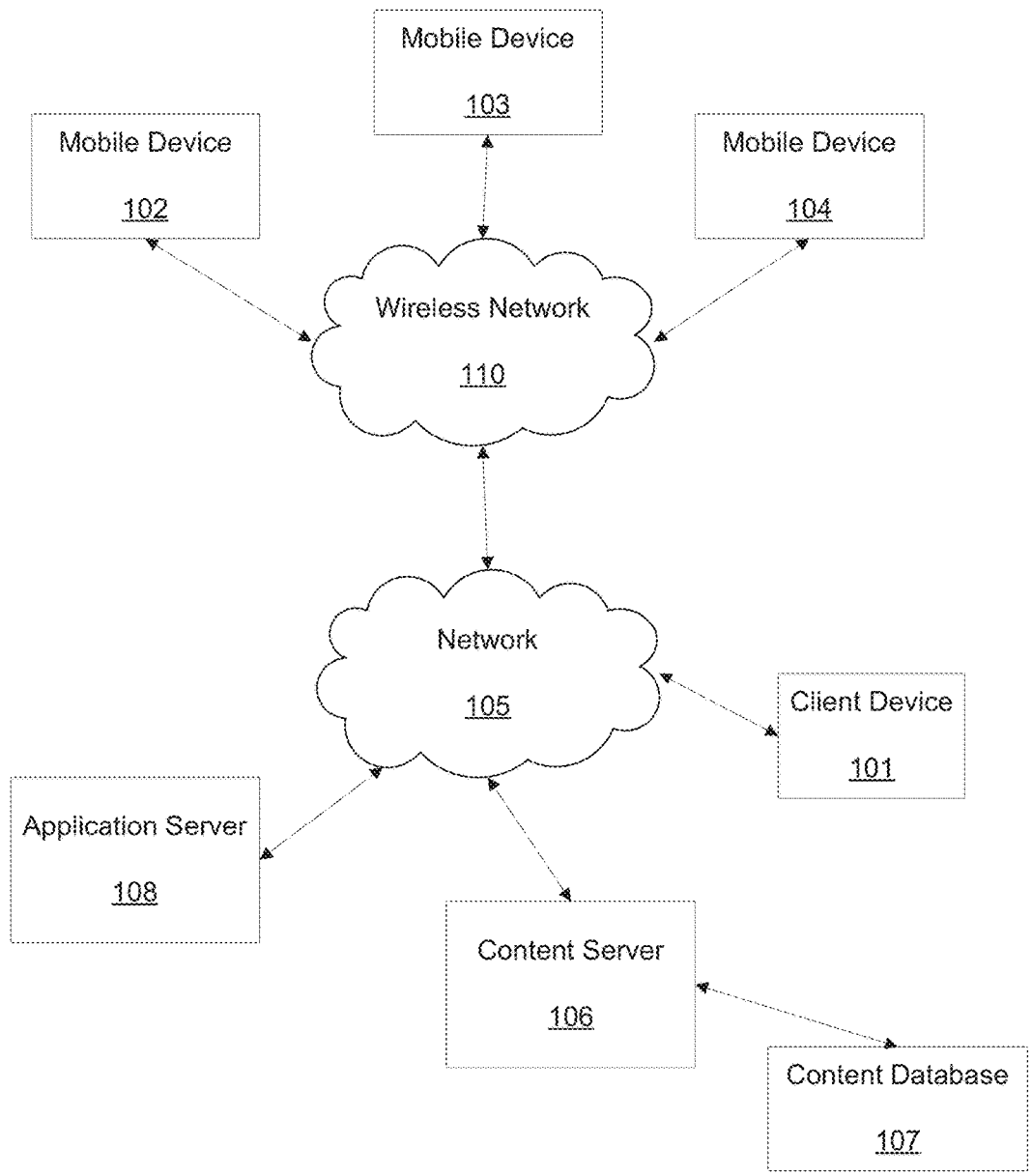
FIG. 1 depicts an example of a system architecture according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope or claimed or covered subject matter is intended.

Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense. The Detailed Description is not intended as an extensive or detailed discussion of known concepts, and as such, details that are known generally to those of ordinary skill in the relevant art may have been omitted or may be handled in summary fashion.

The systems and methods to which this disclosure relates are described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure, a computer-readable medium (or computer-readable storage medium/media) stores computer data, which data can include computer program code that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM (random access memory), ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For purposes of this disclosure, an electronic computing device, electronic device or computing device (also referred to as a server, client device or user device) may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

According to some exemplary embodiments, the electronic device used herein is a multi-touch sensor device, referred to as a touch device. A touch device is a device that typically includes a sensing region that uses capacitive, resistive, inductive, optical, acoustic or other technology to determine the presence, input (or depression), proximity, location and/or motion of one or more fingers, styli, pointers, and/or other objects. The touch device can be operated via input with one or more fingers styli, pointers and/or other objects, and can be used to provide an input to the electronic system, such as a desktop, tablet, notebook computer and smartphone, as well as kiosks and other terminals. As understood in the art, the touch device receives input not only when a user's finger(s) contacts the display screen of the touch device, but also when the user's finger(s) or other object(s) is within a detected proximity to the display screen of the touch device. Thus, the sensing region of the touch device can function as a cursor control/pointing device, selection device, scrolling device, graphics/character/handwriting input device, menu navigation device, gaming input device, button input device keyboard and/or other input device. Additionally, the touch device enables multi-touch capabilities. As understood by those of skill in the art, "multi-touch" refers to the touch device's ability to recognize the presence of two or more points of contact with the sensing region. This plural-point awareness is often used to implement advanced functionality for activating predefined programs, or, e.g., zooming in and zooming out of images via spreading or pinching gestures, respectively.

Although the embodiments discussed herein are described with reference to a touch device, other embodiments exist where the device is a computing device comprises, or is coupled to, a display screen where inputs are registered via a stylus, pointer via a mouse), keyboard entry, or other inputs generally understood to register commands on a traditional computing device.

The preferred embodiments of the present disclosure will now be described with reference to FIGS. 1-7. The present disclosure provides systems and methods for gesture-based content-object rendering, in some embodiments, the disclosed methods and systems enable users to quickly, easily and clearly zoom in on, or enlarge, images displayed in a user interface thereby displaying a high-resolution image. Typically, when a user desires to zoom in on an image, or enlarge an image to view a specific portion of the image, the user desires to view a high-resolution version of the image. That is, typically, a low resolution image version is initially displayed in order to keep an initial page load time down. Thus, upon receiving a user's request to display high-resolution image version of the low-resolution image, the present disclosure provides systems and methods for efficiently displaying such imagery. The present disclosure sets forth remedies to conventional methods which force a user to endure a significant wait (or lag) time in downloading/displaying the high-resolution images by enabling an optimized and efficient display of high-resolution content objects responsive to the received request (or input or gesture).

By way of a non-limiting example, for illustration purposes only, an image is displayed on a user's tablet computer. The initial image can be displayed within a web page or within an application interface. The image is a low-resolution version of the image. The user desires to view a high-resolution version of the image. Therefore, the user provides the computer with an input to request a high-resolution version of the image. As will be discussed in more detail below, such input may be a spread gesture. Upon receiving the spread gesture, a client-side script running on the computer fetches the high-resolution image and effectuates display of the high-resolution image. As discussed in more detail below, the present disclosure improves a user's experience in downloading the high-resolution image. That is, according to exemplary embodiments, the image is subdivided into smaller pieces and stored in a database associated with the content provider providing the image. Therefore, individual blocks near the user's spread gesture input point are fetched based on the input. Subsequently, adjacent blocks are then fetched until the entire image has been downloaded. Thus, the present disclosure optimizes the download of the high-resolution image by reducing the wait time for the rendering of the high-resolution image as each individual high-resolution block is displayed upon receipt.

As discussed herein, for exemplary discussion purposes, the content discussed herein is an image; however, it should not be construed to limit the purposes of this disclosure solely to gesture based interactions with an image. It should be understood by one of ordinary skill in the art that the disclosed systems and methods regarding gesture based input areas/portions of a display area can include, but are not limited to, text, video, animations, maps, web pages, and/or other known or to be known multi-media content types.

Also, as discussed herein, exemplary embodiments occur within a graphical user interface (GUI) displayed on a multi-touch device. However, it should be understood that any array of electronic devices can be used. Such devices, referred to as a client (or user device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

FIG. 1 shows components of a general environment in which the systems and methods discussed herein may be practiced. Not ail the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

One embodiment of mobile devices 102-103 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RE) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc, that may route the signal packet in accordance with a target address and availability of a network path to the target address.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as a social networking site, or a personal user site (such as a Wog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, photo services, web services, third-party services, audio services, video services, email services, instant messaging am) services, SMS services, MMS services, FTP services, voice over IP (VOW) services, or the like. Examples of content may include images, text, audio, video, or the like, which may be processed in the form of physical signals, such as electrical signals, for example, or may be stored in memory, as physical states, for example.

Servers 106 and 108 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106 and/or 108. This may include in a non-limiting example, photo-sharing services servers, social networking services servers, SMS servers, IM servers, MMS servers, email servers, exchange servers, photo-sharing services servers, and travel services servers, via the network 105 using their various devices 101-104. In some embodiments, applications, such as a photo-sharing or viewing application (e.g., Flickr®, Instagram®, and the like), can be hosted by the application server 108. Thus, the application server 108 can store various types of applications and application related information including application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates content server 106 and application server 108 as single computing devices, respectively, the disclosure is not so limited. For example, one or more functions of content server 106 and/or application server 108 may be distributed across one or more distinct computing devices. Moreover, in one embodiment, content server 106 and application server 108 may be integrated into a single computing device, without departing from the scope of the present disclosure.

Figure 2:
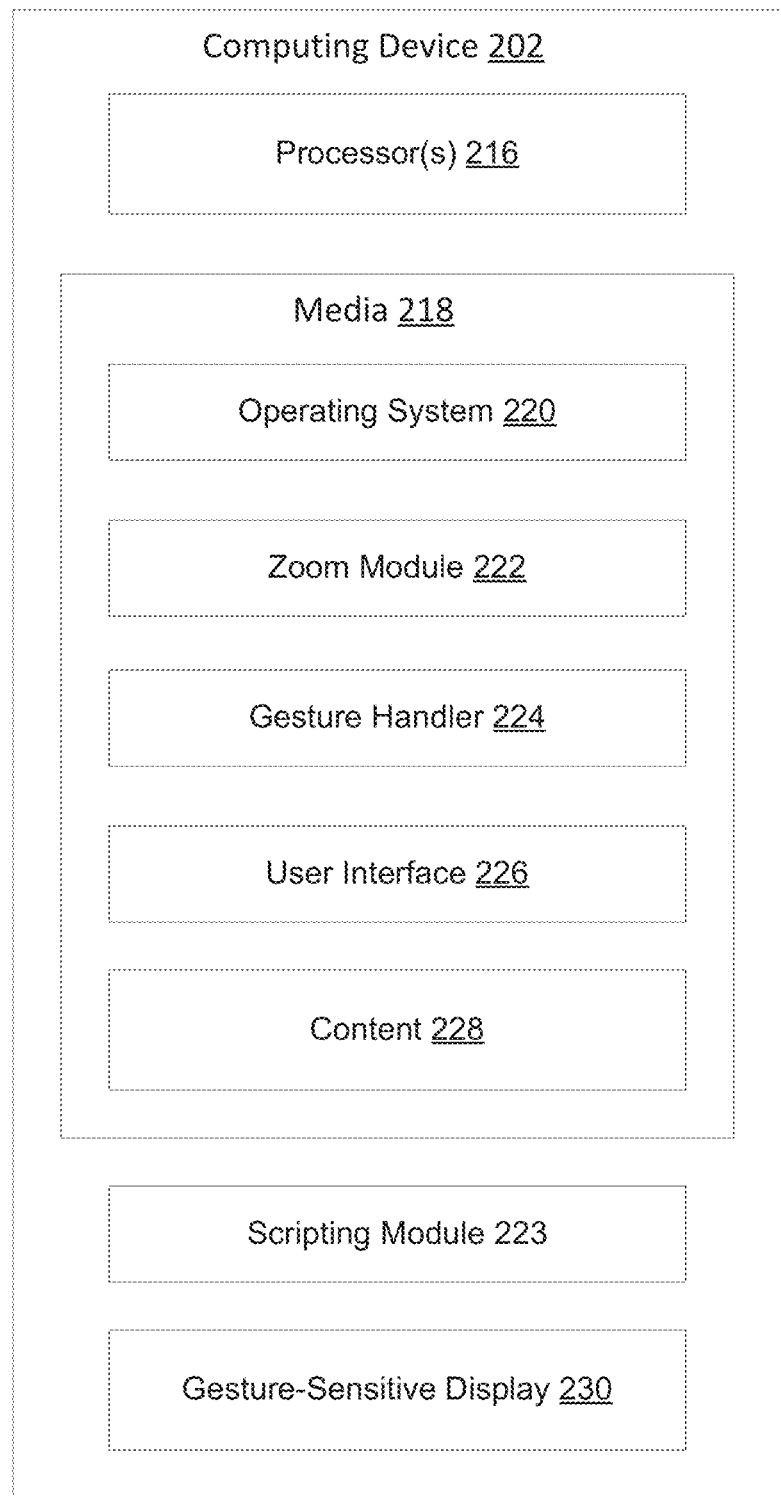
FIG. 2 depicts an embodiment of a computing device according to some embodiments of the present disclosure.

FIG. 2 illustrates an example system in which gesture-based content-object input can be embodied. FIG. 2 depicts a computing device 202, as discussed above with reference to devices 102-104. Computing device 202 includes computer processor(s) 216 and computer-readable storage media 218 (media 218). Media 218 includes an operating system 220, zoom module 222 including or having access to gesture handler 224, user interface 226, and content 228. Computing device 202 also includes one or more gesture-sensitive displays 230 (or touch screen).

Zoom module 222 can be a stand-alone module, or in a module in combination with gesture handler 224 and scripting module 223. The zoom module 222 is capable of determining the content 228 to zoom (or enlarge), or the portion of the content 228, based on a received gesture and causing user interface 226 to zoom this content object 228 to an appropriate size, as well as other capabilities. The zoom module 222 interacts with a scripting module 223 which implements a client-side script, e.g., JavaScript®. The scripting module 223 facilitates communication by the computing device 202 over the network (110, 105) for purposes of the instant disclosure. That is, the scripting module 223 enables the initial display of an image, and the ultimate display of a high-resolution image upon reception and processing of a zoom gesture received by the gesture handler 124, as discussed in more detail below.

In exemplary embodiments, the scripting module 223 implements the client-side script as an integral part of Dynamic HTML (DHTML), or may be a downloaded client application, or "app". The scripting module 223 enables web pages (or documents) to be scripted; that is, the module 223 enables documents to have different and changing content depending on user input, environmental conditions, or other variables. The scripting module 223 will engage client-side scripts which are often embedded within an HTML or XHTML document (e.g., known as embedded scripts). The scripting module 223 will also engage scripts contained in separate files, which are referenced by web pages (or documents) that utilize such scripts (known as external scripts). Thus, upon request, necessary files are sent to the computing device 202 by a web server (e.g., content server 106) on which they reside. Thus, the scripting module 223, via a user's web browser executing on the device 202, executes the script. Client-side scripts may also contain instructions for the scripting module 223 to follow in response to user actions (e.g., clicking on buttons, receiving input gestures, and the like). Often, these instructions can be followed and executed without further communication from the server. Therefore, the scripting module 223 can be implemented as part of a web browser, for example, so that the client-side script may be controlled by the user, the browser, and/or communicate asynchronously, and alter a document, or content within a document that was displayed. It should be understood that known and to be known client-side scripts, such as JavaScript Virtual Machines (VMs) or frameworks built upon them (e.g., Node.js) can be implemented. It should also be understood that the scripting module 223 may interact with server-side scripts, e.g., Perl, PHP, Java and VBScript, and the like, upon a user requesting a document or providing a user input. Such embodiments may involve such server-side scripts containing client-side scripts, as understood by those of skill in the art.

User interface 226 displays, in one or more of gesture-sensitive display(s) 230, content 228. Additionally, as discussed in relation to FIG. 1, content 228 can be received over networks 110 and/or 105 from servers 106 and/or 108. User interface 226 may fill or not fill one or more of gesture-sensitive display(s) 230, and may or may not include a frame (e.g., a windows frame surrounding content 228). Gesture-sensitive display(s) 230 are capable of receiving a gesture having momentum, such as various touch and motion-sensitive systems. Gesture-sensitive display(s) 230 are integrated systems having a display and sensors, though a disparate display and sensors can instead be used. Various components of system 200 can be integral or separate as noted in part above. Operating system 220 can include a variety of operating systems, including a personal computer operating system, such as a WINDOWS®, iOS® or LINUX®, or a mobile operating system, such as iOS®, ANDROID®, or WINDOWS MOBILE®, or the like. Thus, operating system 220, zoom module 222, scripting module 223, gesture handler 224, and/or user interface 226, can be separate from each other or combined or integrated in some form.

Figure 3:
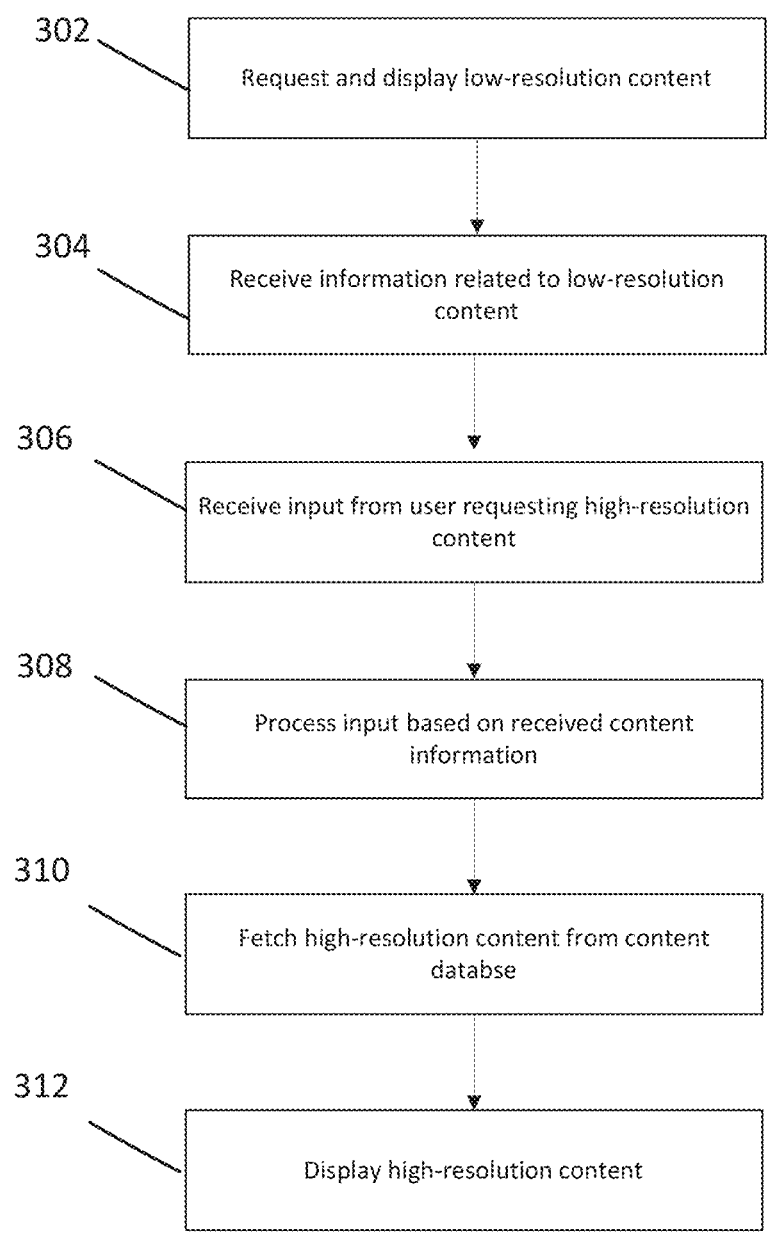
FIG. 3 is a flowchart of a process for displaying a high-resolution image in accordance with some embodiments of the present disclosure.
Figure 4:
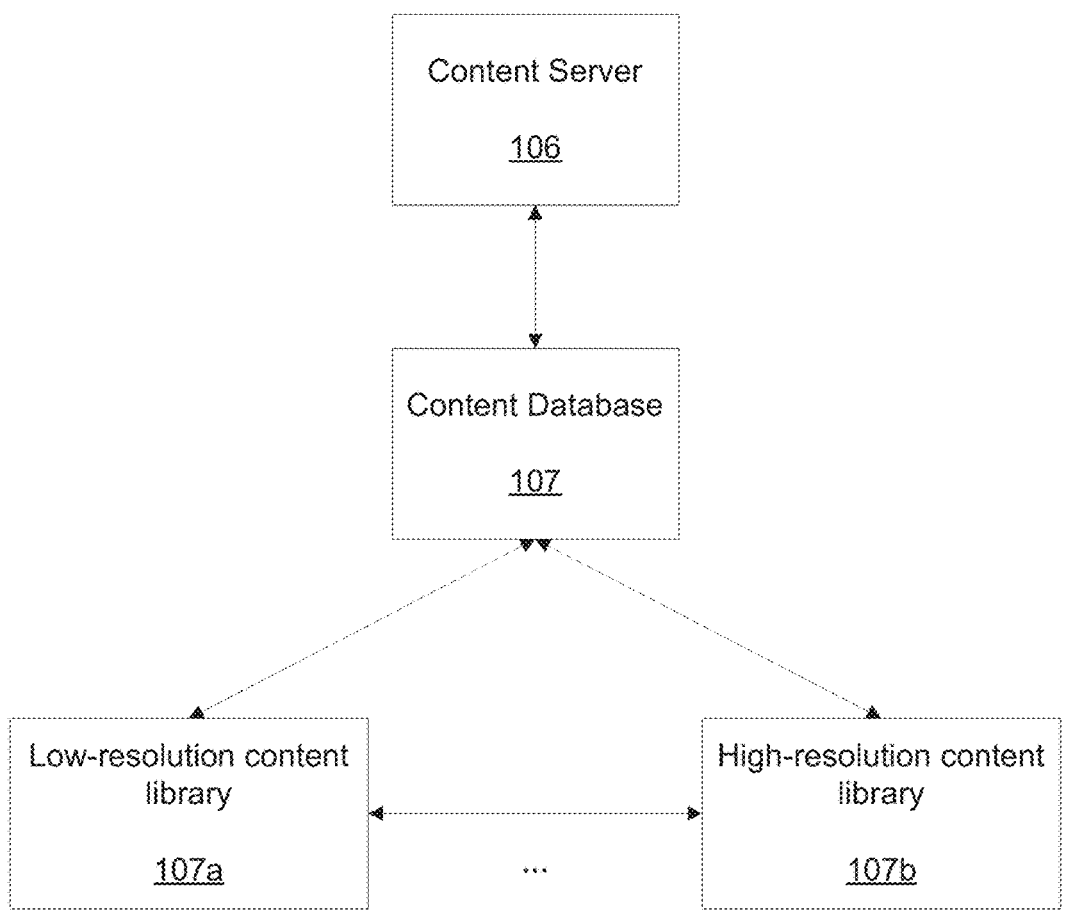
FIG. 4 depicts an embodiment of a content server and content database relationship for storing content in accordance with some embodiments of the present disclosure.

Turning now to FIGS. 3-7, the embodiments will be discussed in relation to enabling users to efficiently download and display requested high-resolution images. FIG. 3 depicts a method 300 for requesting a high-resolution image version of a low-resolution image. In Step 302, a client device, such as a mufti-touch device discussed above in FIG. 2, requests and displays an image. As discussed above, "images" are utilized for explanatory purposes only, as the present disclosure is applicable to any other type of renderable or displayable content. The initial image display is that of a low-resolution image version of the image. The low-resolution image also has associated metadata identifying the image version and other content data related to the image. Such content data includes, but is not limited to, the characteristics of the image such as the content of the image, and other information associated with the image, such as the size, pixels, file type, spatial, spectral and/or temporal information associated with the image, radiometric information, the source/author, copyright information, tags, and the like. As discussed above, the image is received over the network from, for example, content server 106. Content server 106 has an associated content database 107 which stores image versions of the image, as illustrated in FIG. 4. That is, the content database 107 stores high-resolution image and low-resolution image versions of the image.

In exemplary embodiments, the images are stored in a linked library set where multiple versions of the image are stored. That is, the database 107 may comprise two linked libraries, a low-resolution content library 107a and high-resolution content library 107b, housing a low-resolution image version of the image and a high-resolution image version of the image, respectively. It should be understood that any number of libraries may exist respective of the number/variations of resolution versions of an image (for example low, medium, high, very high versions). Each library 107a and 107b may be indexed and mapped in a similar manner, as understood from the below description, to efficiently and properly identify aversion's counterpart. For example, a low resolution image may be indexed with, for example, an identifier "001" within the low-resolution image library 107a within the content database 107. Similarly, the high-resolution image version of the low-resolution image may also be indexed within the high-resolution image library 107b with identifier "001," Therefore, the content server 106 may utilize this indexing information to map each image version to identify and retrieve an image's counterpart, as discussed in more detail below. In some embodiments, the original high-resolution image may be stored in the database 107 as a master image that is not directly manipulated. That is, the original version of the image may be preserved in its high-resolution form, although it may be used to create low-resolution image versions, copies or derivative versions upon the initial request of the image.

In Step 304, the scripting module 223 running on the user's device receives the information associated with the image. That is, the scripting module 223 receives, from the server upon download of the low-resolution image, the content data and metadata associated with the image. The scripting module 223 also receives the image version information and indexing information respective of data housed in the content database 107 discussed above.

In Step 306, computing device receives input, e.g., spread gesture, from the user requesting a high-resolution image version of the image. In some embodiments, the spread gesture input relates to a request from the user to "zoom in" on the image. Thus, the spread gesture effectively requests a high-resolution of the image. This is depicted in FIG. 6B and discussed in more detail immediately below.

Figure 6A:
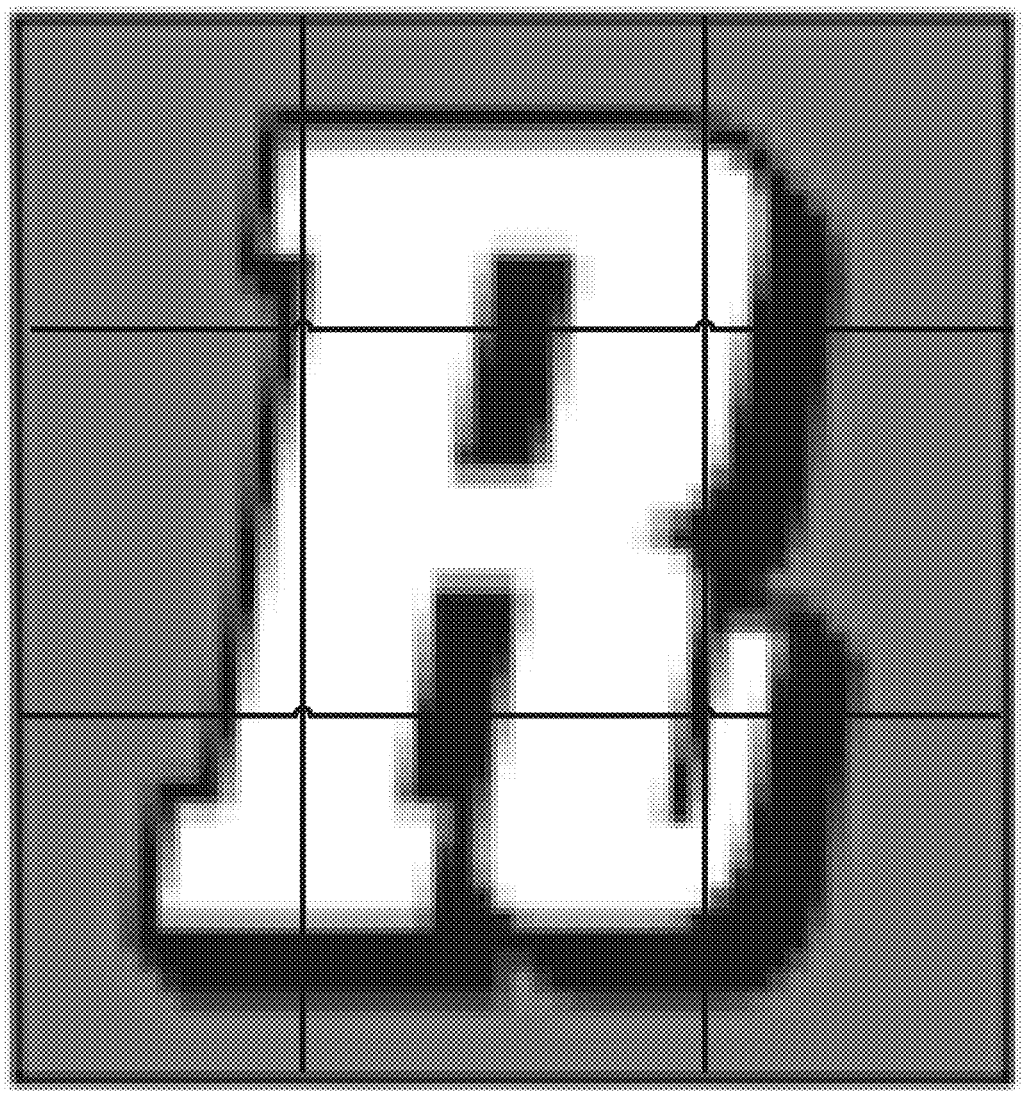
FIGS. 6A-E are examples an image display and high-resolution image download in accordance with embodiments of the present disclosure.
Figure 6B:
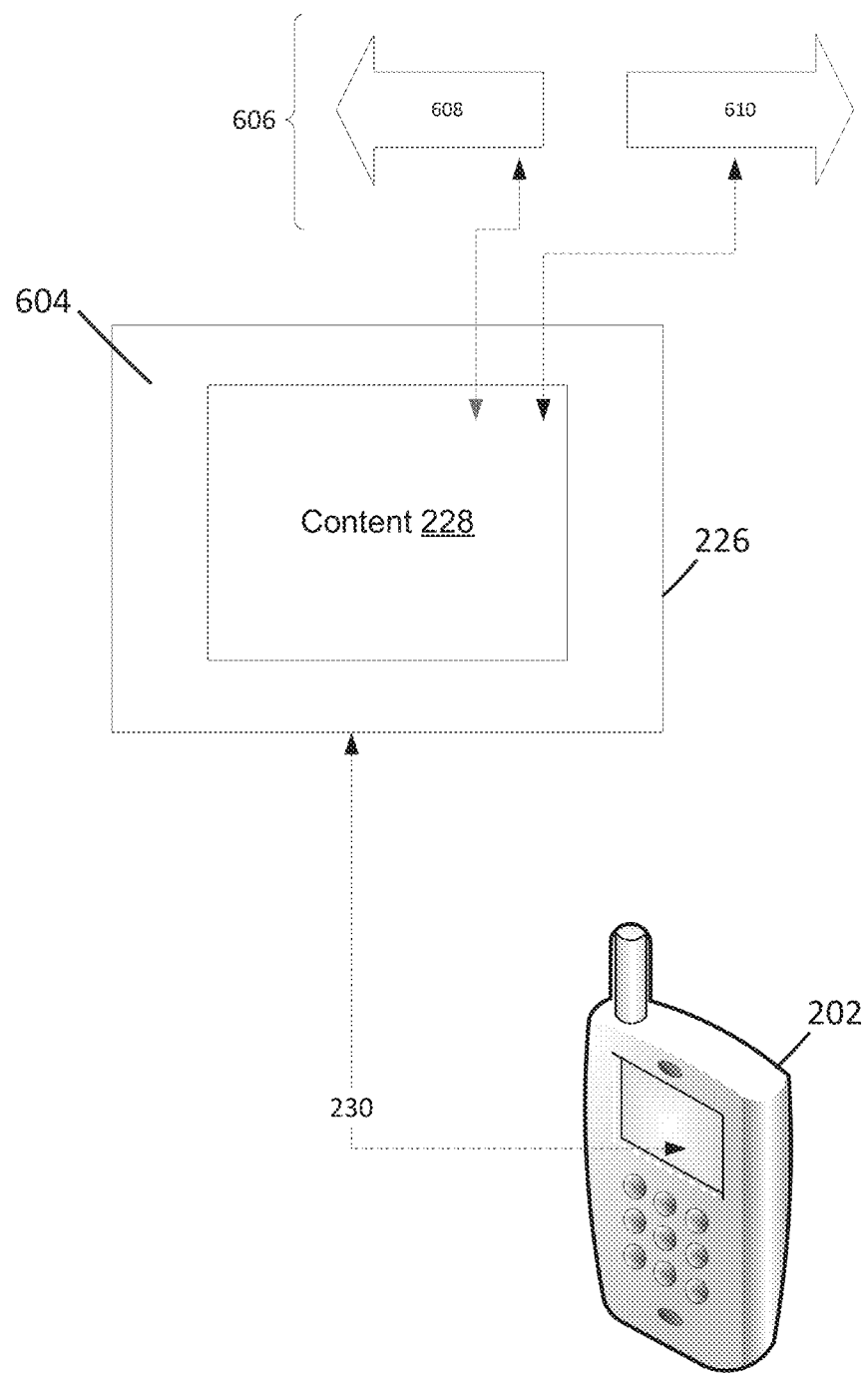

FIG. 6B illustrates a user inputs a spread gesture on the displayed low-resolution image. Specifically, FIG. 69 depicts the multi-touch device 202, as discussed above in FIG. 2. The display 230 can display content 228 displayed on a web page or client side application 604 in a user interface 226. A two-finger spread gesture 606 is shown to be received over user interface 226 and received through gesture-sensitive display 230. Arrows 608 and 610 indicate starting points, movement of the fingers from inside to outside, and end points at the arrow tips of the spread gesture 606. As understood in the art, this gesture is utilized as a typical zoom-in gesture and is typically referred to as a "spread gesture" to magnify a specific target. Note that the momentum, inertia and/or speed of the gesture can also be factors providing the indication of the type of result desired by the user, as understood in the art should also be understood, that other gestures can be utilized as a zoom-in gesture. Such gestures are known, and include, but are not limited to, pinching, tapping, double-tapping, touch and hold, drag, drag-flick, scroll, rotate and other known or to-be-known gestures. Additionally, the present disclosure is not limited to "zoom-in" gestures performed by two fingers, as any array of fingers can be used, such as, but not limited to, single or triple finger gestures. Also, the applicable inputs to effectuate the methods and systems discussed herein are not limited to touch screen devices. That is, the disclosed methods and systems can be performed via inputs from a mouse, keyboard, infrared device, stylus, controller, microphone, sensor, and other known or to be known input devices Turning back to FIG. 3, in Step 308, the scripting module 223 running on the user's device receives an indication of the input gesture from the gesture display 230 and processes the input respective of the information associated with the displayed image received in Step 304. Therefore, the scripting module 223 determines the type of gesture, e.g., spread gesture, and determines the image version and characteristics of the image. In some embodiments, the displayed image is part of a web page, therefore, the scripting module 223 can also determine the specific image identified in the input gesture apart from the other content displayed on the displayed web page.

In Step 310, the scripting module 223 communicates with the content server and fetches the high-resolution image version of the image. The fetching is based upon the image information associated with the originally displayed low-resolution image. Thus, the high-resolution image version of the tow-resolution image is retrieved and displayed. Step 312.

FIG. 5 illustrates an exemplary embodiment for fetching the high-resolution image version of a displayed low-resolution image upon a request (or input) received from a user.

As discussed above in Steps 302-306 in FIG. 3, a low-resolution image is displayed on a user's device. In Step 308, the scripting module 223 fetches (or retrieves) the high-resolution version of the low-resolution image. According to exemplary embodiments, this step includes process 500 which optimizes the download and display of the high-resolution image as discussed in more detail below.

As discussed above, the content server 106 has an associated content database 107 which houses low and high-resolution image versions of an image in respective libraries 107a and 107b. The content database 107 also subdivides each image into several blocks. The breakdown of images into blocks is dynamic. That is, the number of blocks for an image is determined based on the size and/or resolution of the image. For example, for small images, the breakdown of blocks, or block matrix, could be 3×3, as illustrated in FIG. 6A. (It should be understood from the depictions in FIGS. 6A and 6C-E that the lines or grid lines displayed are for illustration purposes only in order to illustrate the block breakdown or subdivision of the image, and that they need not be part of the display of the image.) In other examples, for large images the block matrix may be 16×16. It should be understood that the breakdown of blocks for an image can be any range, e.g., 3×3, 4×4, 8×8, 16×16, 32×32, and the like, depending on screen size and resolution, for example. The breakdown of the image into segments or blocks facilitates accuracy in producing or displaying high-resolution images. That is, the higher number of image blocks per breakdown of an image, the greater the image's size and/or resolution. In some embodiments, the breakdown of blocks for an image can be predetermined by the server (or content provider), by the client-side script running on a user's device (e.g., mobile device), based on the device's capabilities, or any combination thereof. In some preferred embodiments, the image breakdown is a block matrix of 4×4, whereby this breakdown effectively enables current known multi-touch devices to properly display high-resolution images. However, preferred embodiments of block breakdowns may change based on advancements or capabilities in display technology and/or communication systems related to download and display of images.

As discussed above, the versions of an image are indexed, e.g., "001" in their respective linked libraries. Thus, the block breakdown of an image version is also indexed and mapped between the image's counterparts. That is, the breakdown of a low-resolution image is mapped according to a 1 to 1 scheme in accordance with the breakdown of a high-resolution image. For example, for a low-resolution image indexed as "001", and having a 3×3 block breakdown, the index for the storage in the low-resolution library 107a may be: "001a, 001b, 001c . . . 001h and 001i" (where the 3×3 matrix for the low-resolution image involves 9 blocks: "a" through "i"). Thus, in the high-resolution library 107h, the high-resolution image version indexed as "001" may be indexed as follows: "001A, 001B, 001C . . . 001H and 001I" (where the 3×3 matrix for the high-resolution image involves 9 blocks: "A" through "I"). It should be understood that the indexing of blocks "a though i" of the low-resolution image and blocks "A through I" for the low-resolution's high-resolution counterpart relate to the same block; however, the blocks of the high-resolution image comprise high-resolution imagery, whereas the low-resolution blocks comprise low-resolution imagery. The blocks in each library are indexed in their respective library and mapped according to a 1 to 1 mapping scheme. For example, low-resolution block "001a" is indexed and relates to (or maps to) high-resolution block "001A". Therefore, the blocks in library 107a and library 107b within the content database 107 can be indexed according to known or to be known data schemes for storing and retrieving blocks efficiently, e.g., a stack or tree where an initially identified block triggers adjacent blocks to be quickly and efficiently identified and retrieved.

Alternatively, or in addition, the subdivision of the image into blocks may be based on the quantification of the resolution of the image. That is, the block size/matrix can be tied to physical sizes of an image, e.g., lines per millimeter or lines per inch), to the overall size of an image, e.g., lines per picture height known as TV lines (TU), or to an angular subtenant of the image.

Turing back to FIG. 3, upon receiving the image information as in Step 304, the scripting module 223 also receives the indexing information discussed above related to the block breakdown of the image. This enables the scripting module 223 to accurately and efficiently identify a low-resolution image's high-resolution counterpart upon fetching the high-resolution image, as discussed herein. That is, in addition to receiving the content data and metadata associated with the low-resolution image, and the version information, the scripting module also receives the subdivision information, e.g., the indexing information related to the block breakdown and mapping information for identifying an image's counterpart. This information can be included in the content data received in Step 304.

Figure 6C:
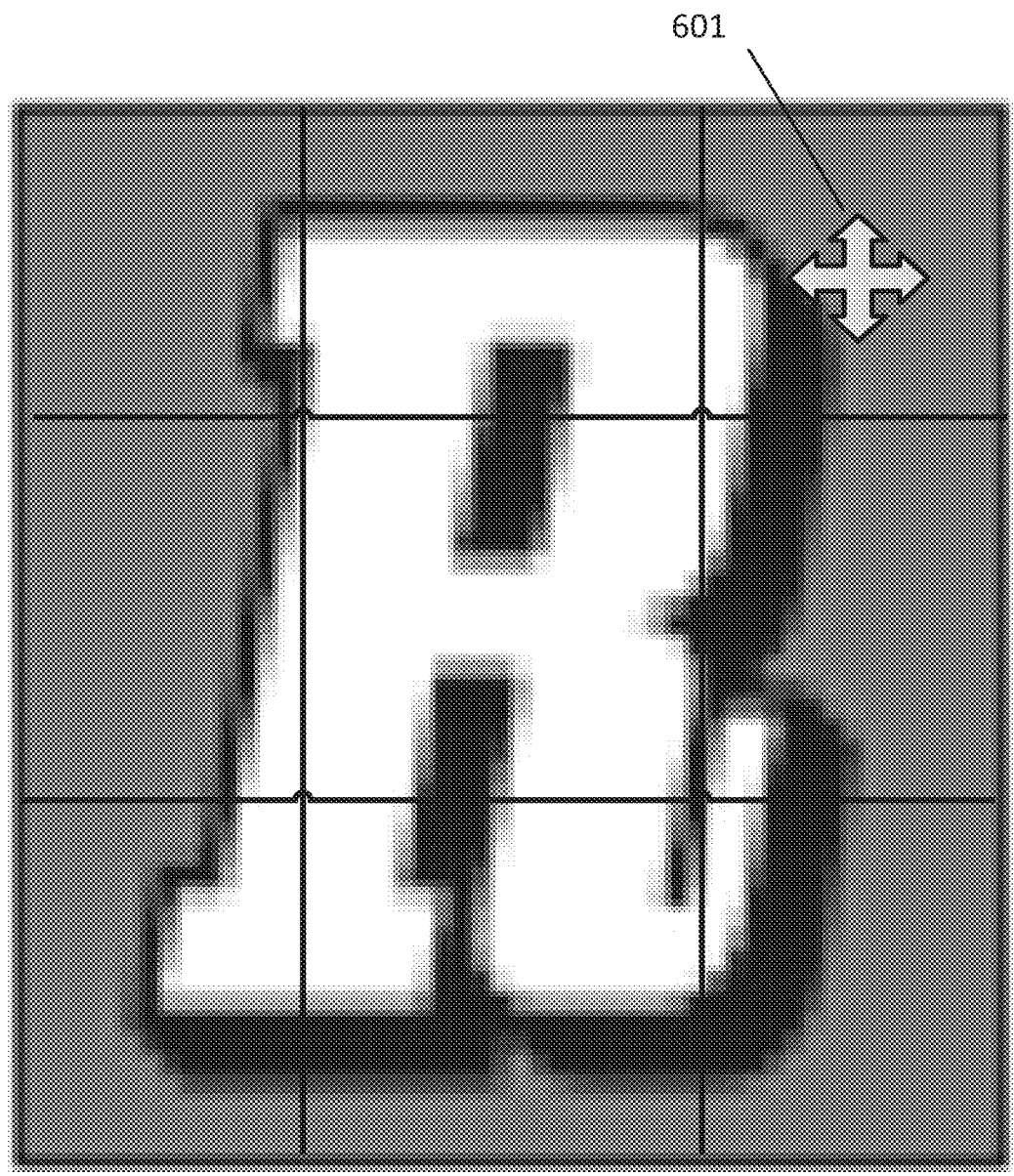

Turning to FIG. 5, which continues from Step 308 of FIG. 3, the scripting module 223 determines the location of the user input respective of the displayed low-resolution image. Step 502. That is, the user inputs a spread gesture on the image. The user input's specific point of contact with the touch screen identifies an "interest point" on the image. This interested point can be identified based on the subdivision information (or block breakdown) of the image. As discussed above, an image is broken down into, for example, 9 blocks in a 3×3 matrix. As illustrated in FIG. 6C, the image is broken down into 9 blocks (3 rows and 3 columns): "001a, 001b, 001c, 001d, 001e, 001f, 001g, 001h, 001i". Thus, as depicted in FIG. 6C, the interest point 601 is the top-right block of the image: block "001c". Alternative embodiments exist where the interest point of the image (or a specific portion or block of an image) can determined based on coordinates of the display screen (x,y; x,y,z; or x,y,z, t), where the user's input is calculated based on the point of contact with the screen. One of ordinary skill in the art would recognize that such known or to be known techniques for identifying a "multi-touch" input are applicable and are recognizable methods for identifying a location on an image (or screen).

In Step 504, the scripting module 223 determines the specific block (or portion) of the image corresponding with the interest point associated with the user's input. For example, as discussed above, the interest point 601 of the user's input occurred at block: "001c"; therefore, the determined block, is "001c" of the low-resolution image. In some embodiments, a spread gesture may cross (or scan) over multiple blocks, as the user's input may span a region governed by two or more separate blocks of an image. As discussed herein, the same processes should be followed where in such circumstances the "interest point" will then include all regions (or blocks) included within the user's spread gesture.

In Step 506, the scripting module 223 sends a request to the server for the low-resolution image's high-resolution counterpart. That is, the request specifically requests only the high-resolution block corresponding the identified low-resolution image block determined from Step 504. As discussed above, the low and high-resolution images are mapped via linked libraries. That is, a low-resolution image is indexed so that its high-resolution image version is readily identifiable, and vice versa. Additionally, while the each image block is subdivided into blocks, each version's blocks are also linked so that they can easily and efficiently be mapped for quick identification and retrieval. Therefore, the scripting module's 223 request comprises information identifying the image's resolution (or version) and the block index. For example, as discussed above, the identified block of the image was "001c". Therefore, the request in Step 506 comprises information identifying the image's version (e.g., low resolution) "001" and block "c". Requesting (or fetching) one block at a time reduces download times and optimizes network loads and bandwidth. Also, since multi-touch devise are preferably running on cellular or Wi-Fi networks, fetching/retrieving one block at a time avoid lags in download time. Additionally in instances of switching between cellular to Wi-Fi networks for data downloads, the presently disclosed systems and methods avoid offloading and roaming.

Figure 6D:
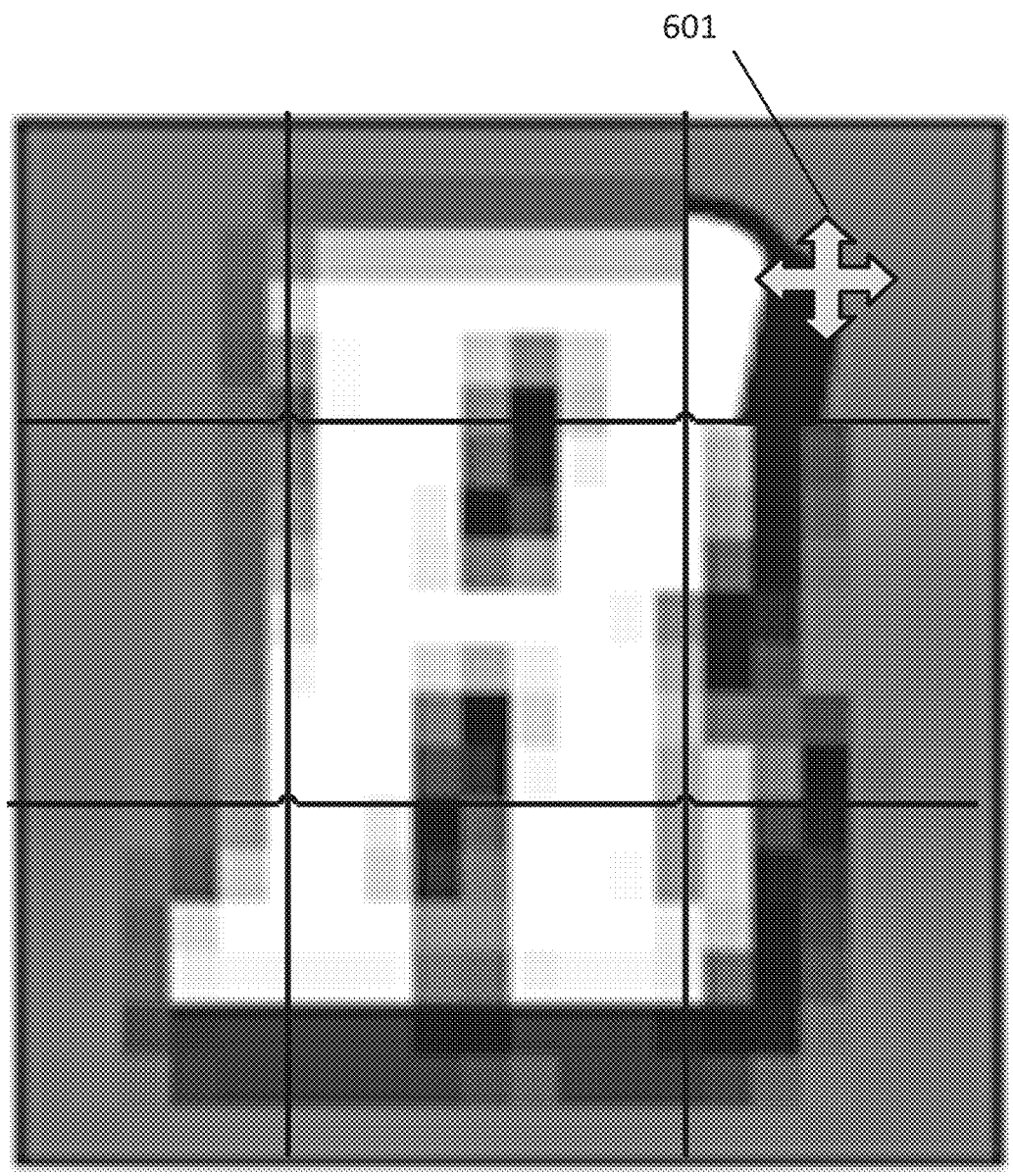

In Step 508, the server identifies the high-resolution image block associated with the block identified in the request, and transmits the high-resolution image block to the user device. For example, the request identified low-resolution image block "001c". Based on this information, the server analyzes this information and maps the low-resolution image block to its high-resolution block counterpart. From the example discussed herein, the low-resolution image block identified in the request is "001c"; therefore, based on the indexing and mapping scheme between the libraries 107*a*, 107*b* within database 107, the high-resolution image block that is identified and transmitted to the device is "001C". Embodiments also exist where the scripting module 223 may perform Step 508 as the information is readily available via the scripting module 223 fetching such information based on the content data received in S 304. Upon reception of the high-resolution image block, the received block is overlaid on top of the original image. Step 510. In some embodiments, the received high-resolution block may need to be resized to fit the original dimensions (or zoomed in or display dimensions) of the initially displayed low-resolution content block (or current display characteristics/capabilities). Therefore, the image looks (or appears) seamless without any distortion between the original (and remaining) low-resolution image blocks and the overlaid high-resolution block, as illustrated in FIG. 6D; however, the low-resolution image blocks (or portions) remain a low-quality and appear coarser (or blurred).

After the first high-resolution image block is transferred and downloaded, the process continues for the remaining low-resolution blocks, if there are any. Step 511. Specifically, in Step 511, process 500 determines if there are any remaining low-resolution blocks displayed respective of the image. Instances may arise where the image is only a single image block; therefore the process 500 would be complete. Step 520. Also, as discussed in more detail below, all of the high-resolution image blocks may have already been downloaded and displayed. As such, the process 500 would complete. Step 520.

Specifically, if there are remaining low-resolution image blocks remaining in the image, in Step 512, the scripting module 223 identifies the adjacent blocks (or neighboring blocks or "neighborhood") to the identified block from Step 504. In exemplary embodiments, the identified "neighborhood" of blocks, or adjacent blocks are those blocks that share a border with the initial identified block corresponding to the user's input (e.g., spread gesture). In some embodiments, the "neighborhood" can be identified as those blocks sharing a row or column with the initially identified block, where the other blocks on the same row or column as the initial identified block are then retrieved after the initial block. In Step 514, the scripting module 223 then requests the adjacent block's high-resolution counterpart one at a time. After retrieval of the adjacent block's high-resolution counterpart, Step 516, the high-resolution counterpart is then displayed, Step 518, in a similar manner as discussed above in relation to Step 510. Thus, in Step 518, the received (or retrieved) high-resolution blocks respective of the low-resolution adjacent block(s) are overlaid on the image and displayed. The process 500 then determines if there are remaining low-resolution image blocks adjacent to the determined adjacent blocks(s) (e.g., the recently displayed high-resolution blocks). Step 511. If so, the process 500 repeats (or continues) respective of adjacent blocks to the previously downloaded and displayed high-resolution blocks (or previously identified adjacent blocks), as in Steps 512-518. That is, if a low-resolution image block(s) remain, the process 500 repeats Step 512 by identifying adjacent blocks to the previously downloaded high-resolution blocks and repeats Steps 514-518 for such identified adjacent block(s).

Figure 6E:
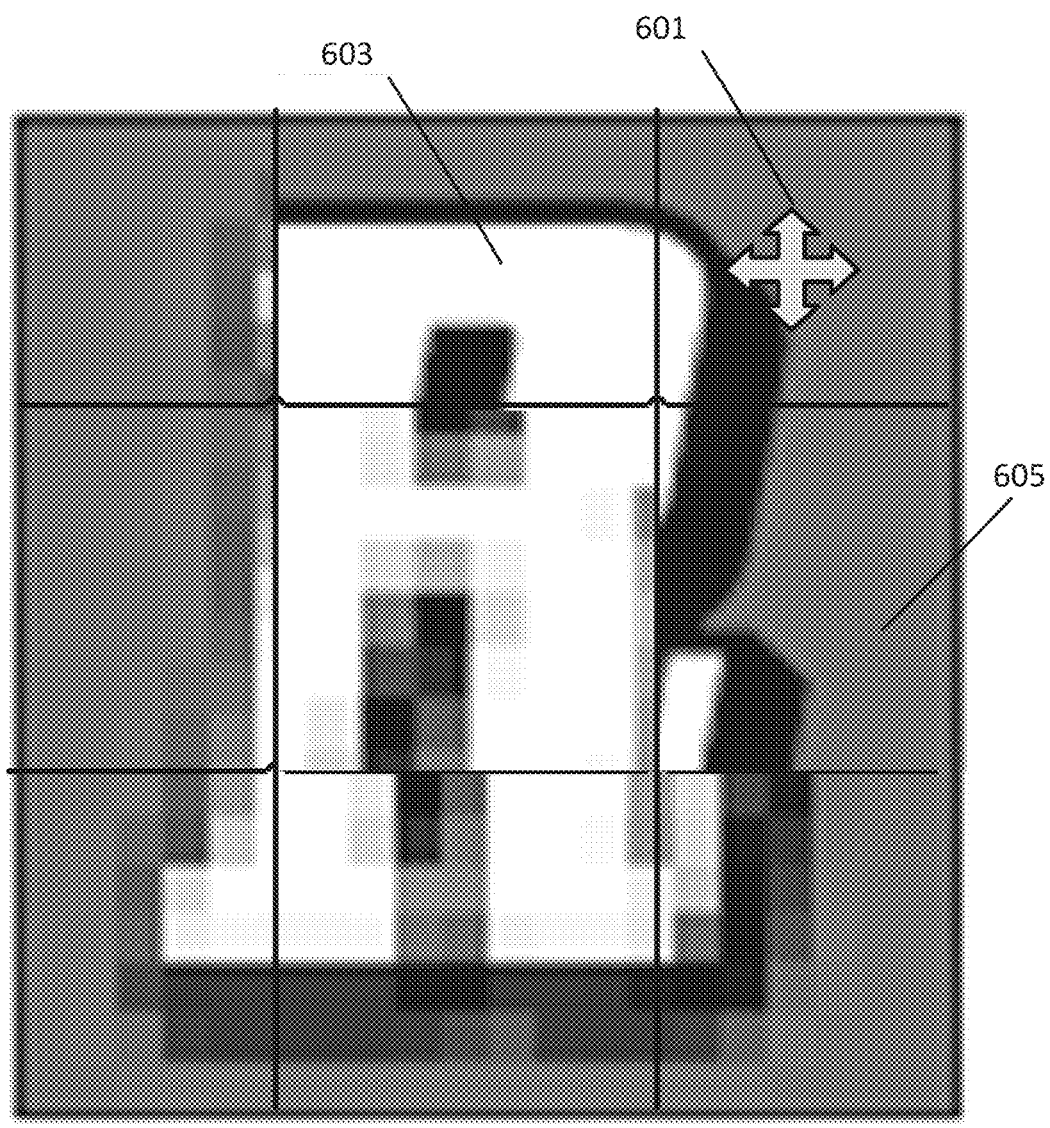

According to some embodiments, adjacent or proximate blocks are identified, and their high-resolution block counterparts are requested and displayed sequentially until the entire image is a high-resolution image. That is, adjacent blocks are preferably downloaded singularly (or one at a time) in order to naturally fill the remainder of the image with high-resolution image blocks. This is illustrated in FIG. 6E where initial block "001c" has been overlaid with high-resolution block "001C" (item 601), and adjacent blocks to "001C", blocks "001b" and "001f" have been overlaid with high-resolution blocks "0019" and "00117" (items 603 and 605), respectively. Thus, the download of the blocks occurs one at a time so as not to interfere with the user's enjoyment of the image, thereby optimizing download time and avoiding lag in downloading the entire image's high-resolution version (or zoom-in on the image). Therefore, for example, after the download of "001C", "001B" is then downloaded, then "001F" is downloaded. After this, the remaining blocks are downloaded in accordance with process 500 until the entire displayed image as zoomed in on is a high-resolution image. In other embodiments, the adjacent blocks (or all of the blocks including the initial block) can be downloaded at the same time, and displayed sequentially based on the user's input. This alternative process may be applicable where network bandwidth is adequate so as not to disrupt the image display or download time. In some embodiments, the scripting module 223 need not request the subsequent blocks remaining in the image. That is, the server may identify that low-resolution blocks remain within the image based on the index within the content server 107 (or stack/tree); therefore, the server may then parse the library index, map the low-resolution blocks to the high-resolution blocks based on the library index, and transmit the adjacent high-resolution counterpart blocks. Thus, the server will stop transmitting high-resolution blocks when the library index (or stack or tree)) is empty.

As discussed herein, and according to some embodiments in accordance with the discussion of FIGS. 5 and 6A-6E, a zoom gesture results in a low-resolution image being zoom-in on at the zoom gesture location. Thus, in some embodiments, the display of the zoomed in image may only be of that portion of the image. Therefore, other portions of the image may not be displayed unless the display pans to those image portions. In some embodiments, the handling of the image resolution conversion occurs despite the lack of actual display on a device; however, embodiments also exist where image portions out of the display range are converted to high-resolution zoomed-in images only upon panning of the display to focus on those image portions. Thus, from the above example, if "001C" is initially displayed, and only displayed on a display screen, upon panning to image portion "001b" will "001B" be overlaid according to the methods discussed above.

For purposes of this disclosure, the above discussion provided systems and methods for displaying a high-resolution image in response to a user's input (e.g., spread gesture) upon the initial display of a low-resolution image. However, it should be understood that the process can be reversed where the initial image is a high-resolution image, and the user desires to display a low-resolution version of the high-resolution image. Among other types of viable reasons to reverse the procedure, the reversal from high-resolution to low-resolution can occur in response to a user's "pinch" gesture, or zooming out from an image.

FIG. 7 is a block diagram illustrating an internal architecture of a computing device, e.g., a computing device such as server or user computing device, in accordance with one or more embodiments of the present disclosure. FIG. 7 illustrates a computer system upon which some exemplary embodiments of the present disclosure may be implemented. Although computer system 700 is depicted with respect to a particular device or equipment, it is contemplated that other devices or equipment (e.g., network elements, servers, processors) within can deploy the illustrated hardware and components of system 700.

As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein, CPU 712 first loads computer executable process steps from storage, e.g., memory 704, computer readable storage medium/media 706, removable media drive, and/or other storage device, CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730, ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

communicating, via a computing device over a network, a request for content to a content provider, said content provider associated with a database storing a first content version of said content and a second content version of said content, each content version comprising a subdivision of content blocks mapped to respective content blocks of the other content version;

receiving, at the computing device, the first content version in response to said request, said receiving comprising receiving subdivision information describing the subdivision of the first content version respective to the second content version;

displaying, via the computing device, an electronic page comprising the first content version on a display associated with the computing device;

receiving, at the computing device, an input from a user corresponding to the displayed first content version;

determining, by the computing device, a type of said received input;

identifying, via the computing device, a first content block of the displayed first content version corresponding to the input based on the subdivision information and the determined type of input;

fetching, via the computing device, a second content block of the second content version mapped to the first content block of the first content version based on the subdivision information;

resizing, via the computing device, the fetched second content block based on the input;

automatically modifying, via computing device, the electronic page, said modification causing the electronic page to be automatically updated to display the resized second content block of the second content version by overlaying the resized second content block over the identified first content block, such that the display of the first content object comprises the resized second content block associated with the second content version and all other first content blocks associated with the first content version;

determining, via the computing device, an adjacent block to the displayed second content block, said adjacent block being a first content block within said subdivision of the first content version that shares a border with the second content block;

fetching, via the computing device, another second content block within said subdivision of the second content version that corresponds to the determined adjacent block based on the subdivision information associated with the adjacent block; and displaying, via the computing device, said another second content block, wherein said displaying comprises overlaying said another second content block of the second content version over said adjacent block.

2. The method of claim 1, wherein said fetching comprises:

communicating a second request for the second content block of the second content version, said second request comprising said subdivision information associated with the identified first content block, wherein said subdivision information is utilized to identify the second content block of the second content version by mapping the identified first content block of the first content version to the second content block of the second content version; and receiving the second content block based on a result of said mapping.

3. The method of claim 1, wherein said fetching said another second content block comprising:

communicating a third request for said another second content block of the second content version that corresponds to the determined adjacent block, said third request comprising said subdivision information associated with said adjacent block, wherein said subdivision information is utilized to identify said another second content block by mapping the determined adjacent block within the subdivision of the first content version to said another second content block of the second content version; and receiving said another second content block based on a result of said mapping.

4. The method of claim 1, further comprising:
determining which version of said content the displayed content blocks correspond to,
wherein, if at least one displayed content block corresponds to the first content version, continue identifying adjacent blocks and fetching second content block versions of said adjacent blocks until the entire displayed image comprises second content blocks associated with the second content version, and
wherein, if the content displayed is entirely comprised of second content blocks associated with the second content version, said second content version is displayed.

5. The method of claim 1, wherein said subdivision of the first content version and subdivision of the second content version is based on the resolution of said content.

6. The method of claim 1, wherein the computing device comprises multi-touch capabilities, wherein the input is a spread gesture requesting to zoom-in on the displayed first content version.

7. The method of claim 1, wherein the first content version is a low-resolution version of said content and the second content version is a high-resolution version of said content.

8. The method of claim 1, wherein said content is an image.

9. A non-transitory computer-readable storage medium tangibly encoded with computer-executable instructions, that when executed by a computing device, perform a method comprising:
communicating, via the computing device over a network, a request for content to a content provider, said content provider associated with a database storing a first content version of said content and a second content version of said content, each content version comprising a subdivision of content blocks mapped to respective content blocks of the other content version;
receiving, at the computing device, the first content version in response to said request, said receiving comprising receiving subdivision information describing the subdivision of the first content version respective to the second content version;
displaying, via the computing device, an electronic page comprising the first content version on a display associated with the computing device;
receiving, at the computing device, an input from a user corresponding to the displayed first content version;
determining, by the computing device, a type of said received input;
identifying, via the computing device, a first content block of the displayed first content version corresponding to the input based on the subdivision information and the determined type of input;
fetching, via the computing device, a second content block of the second content version mapped to the first content block of the first content version based on the subdivision information;
resizing, via the computing device, the fetched second content block based on the input;
automatically modifying, via computing device, the electronic page, said modification causing the electronic page to be automatically updated to display the fetched second content block of the second content version by overlaying the fetched second content block over the identified first content block, such that the display of the first content object comprises the second content block associated with the second content version and all other first content blocks associated with the first content version;
determining, via the computing device, an adjacent block to the displayed second content block, said adjacent block being a first content block within said subdivision of the first content version that shares a border with the second content block;
fetching, via the computing device, another second content block within said subdivision of the second content version that corresponds to the determined adjacent block based on the subdivision information associated with the adjacent block; and
displaying, via the computing device, said another second content block, wherein said displaying comprises overlaying said another second content block of the second content version over said adjacent block.

10. The non-transitory computer-readable storage medium of claim 9, wherein said fetching comprises:
communicating a second request for the second content block of the second content version, said second request comprising said subdivision information associated with the identified first content block, wherein said subdivision information is utilized to identify the second content block of the second content version by mapping the identified first content block of the first content version to the second content block of the second content version; and
receiving the second content block based on a result of said mapping.

11. The non-transitory computer-readable storage medium of claim 9, wherein said fetching said another second content block comprising:
communicating a third request for said another second content block of the second content version that corresponds to the determined adjacent block, said third request comprising said subdivision information associated with said adjacent block, wherein said subdivision information is utilized to identify said another second content block by mapping the determined adjacent block within the subdivision of the first content version to said another second content block of the second content version; and
receiving said another second content block based on a result of said mapping.

12. The non-transitory computer-readable storage medium of claim 9, further comprising:
determining which version of said content the displayed content blocks correspond to,
wherein, if at least one displayed content block corresponds to the first content version, continue identifying adjacent blocks and fetching second content block versions of said adjacent blocks until the entire displayed image comprises second content blocks associated with the second content version, and
wherein, if the content displayed is entirely comprised of second content blocks associated with the second content version, said second content version is displayed.

13. The non-transitory computer-readable storage medium of claim 9, wherein said subdivision of the first content version and subdivision of the second content version is based on the resolution of said content.

14. The non-transitory computer-readable storage medium of claim 9, wherein the first content version is a low-resolution version of said content and the second content version is a high-resolution version of said content.

15. A system comprising:
at least one computing device comprising:
memory storing computer-executable instructions; and
one or more processors for executing said computer-executable instructions, comprising:
  communicating a request for content to a content provider, said content provider associated with a database storing a first content version of said content and a second content version of said content, each content version comprising a subdivision of content blocks mapped to respective content blocks of the other content version;
  receiving the first content version in response to said request, said receiving comprising receiving subdivision information describing the subdivision of the first content version respective to the second content version;
  displaying, an electronic page comprising the first content version on a display associated with the computing device;
  receiving an input from a user corresponding to the displayed first content version;
  determining a type of said received input;
  identifying a first content block of the displayed first content version corresponding to the input based on the subdivision information;
  fetching a second content block of the second content version mapped to the first content block of the first content version based on the subdivision information and the determined type of input;
  resizing the fetched second content block based on the input;
  automatically modifying the electronic page, said modification causing the electronic page to be automatically updated to display the fetched second content block of the second content version by overlaying the fetched second content block over the identified first content block, such that the display of the first content object comprises the second content block associated with the second content version and all other first content blocks associated with the first content version;
  determining an adjacent block to the displayed second content block, said adjacent block being a first content block within said subdivision of the first content version that shares a border with the second content block;
  fetching another second content block within said subdivision of the second content version that corresponds to the determined adjacent block based on the subdivision information associated with the adjacent block; and
  displaying said another second content block, wherein said displaying comprises overlaying said another second content block of the second content version over said adjacent block.

16. The system of claim 15, further comprising:
communicating a second request for the second content block of the second content version, said second request comprising said subdivision information associated with the identified first content block, wherein said subdivision information is utilized to identify the second content block of the second content version by mapping the identified first content block of the first content version to the second content block of the second content version; and
receiving the second content block based on a result of said mapping.

* * * * *